United States Patent [19]

Obara et al.

[11] Patent Number: 4,614,854

[45] Date of Patent: Sep. 30, 1986

[54] WIRE EDM CONTROL CIRCUIT FOR ROUGH AND FINISHED MACHINING

[75] Inventors: Haruki Obara, Sagamihara; Shunzo Izumiya, Hachiouji, both of Japan

[73] Assignee: Fanuc Ltd, Minamitsuru, Japan

[21] Appl. No.: 618,394

[22] PCT Filed: Nov. 11, 1983

[86] PCT No.: PCT/JP83/00407

§ 371 Date: May 22, 1984

§ 102(e) Date: May 22, 1984

[87] PCT Pub. No.: WO84/01915

PCT Pub. Date: May 24, 1984

[30] Foreign Application Priority Data

Nov. 15, 1982 [JP] Japan .................. 57-199043

[51] Int. Cl.⁴ .................................. B23H 1/02
[52] U.S. Cl. .................. 219/69 C; 219/69 P; 219/69 S
[58] Field of Search ............. 219/69 C, 69 S, 69 P, 219/69 W

[56] References Cited

U.S. PATENT DOCUMENTS

| | | | |
|---|---|---|---|
| 3,138,690 | 6/1964 | Webb | 219/69 S |
| 3,627,968 | 12/1971 | Sennowitz | 219/69 C |
| 3,649,802 | 3/1972 | Sennowitz | 219/69 C |
| 3,671,705 | 6/1972 | Razuitsyn | 219/69 C |
| 3,805,012 | 4/1974 | Bell, Jr. et al. | 219/69 C |
| 3,816,692 | 6/1974 | Ratmansky | 219/69 S |
| 3,832,510 | 8/1974 | Pfau et al. | 219/69 C |
| 3,843,864 | 10/1974 | Wohlabaugh | 219/69 G |
| 3,875,362 | 4/1975 | Balleys | 219/69 P |
| 3,943,321 | 3/1976 | Pfau et al. | 219/69 C |
| 4,395,612 | 7/1983 | Izumiya | 219/69 C |
| 4,431,895 | 2/1984 | Obara | 219/69 S |

FOREIGN PATENT DOCUMENTS

| | | | |
|---|---|---|---|
| 114622 | 9/1981 | Japan | 219/69 C |
| 57-89523 | 6/1982 | Japan | 219/69 C |
| 2068816 | 8/1981 | United Kingdom | 219/69 M |

Primary Examiner—Clarence L. Albritton
Assistant Examiner—Geoffrey S. Evans
Attorney, Agent, or Firm—Staas & Halsey

[57] ABSTRACT

A wire EDM circuit uses a references voltage connected to a short circuit detector for comparing an average voltage with a reference voltage. Whenever the average voltage is below the reference voltage the numeric controller causes the pulse oscillator to stop generating a pulse stream. In order to also finish machine the workpiece a reference voltage switching circuit is used to decrease the reference voltage. There is also provided an internal signal blocking circuit to block an interval signal oscillator to stop generation of the pulse stream when the wire electrode is temporarily in contact with the workpiece or when phenomena similar to a short circuit occurs.

9 Claims, 2 Drawing Figures

WIRE EDM CONTROL CIRCUIT FOR ROUGH AND FINISHED MACHINING

BACKGROUND OF THE INVENTION

The present invention relates to an electric discharge machining control circuit in a wire cut electric discharge machine for performing electric discharge machining using a wire electrode. The electric discharge machining control circuit has a specific circuit for controlling a second cut after a first cut.

In a wire cut electric discharge machine, a predetermined voltage is applied to a gap formed between a wire electrode and a workpiece so as to cause a discharge between the wire electrode and the workpiece, thereby cutting the workpiece by a small amount each time via the discharge energy. Conventionally, after the first cut has been performed, the second cut is performed to correct the shape of the workpiece, smooth any rough surface, and remove any irregularities caused by machining during the first cut. In order to smooth a roughened surface, a low discharge energy is preferably used. When a low discharge energy is used, the shape of the workpiece can be easily corrected. However, when a thick workpiece is machined with low discharge energy, a machined wall surface of the workpiece is curved, thereby resulting in a loss of linearity. For example, when a workpiece having a thickness of 60 mm is subjected to the second cut, an internal portion is removed by 20 to 30 μm from the edge of the machined wall surface, thereby often resulting in a loss of linearity of the cut surface.

When the discharge energy is increased, the linearity of the cut surface can be improved. However, the wire vibrates due to a discharge pressure and moves away from from the machined wall surface. As a result, sufficient shape corection cannot be performed.

For this reason, extensive studies and experiments have been made on the second cut process. It was found that the above drawback could be eliminated by decreasing an average machining voltage during the second cut operation.

SUMMARY OF THE INVENTION

It is a first object of the present invention to provide an electric discharge machining control circuit for a wire cut electric discharge machine, wherein an average applied voltage during machining is decreased so as to easily perform shape correction, smooth roughened surfaces, and removal of any irregularities, thereby allowing a second cut to be performed with highly precise linearity.

It is a second object of the present invention to provide an electric discharge machining control circuit for a wire cut electric discharge machine which can stabilize dscharge machining during the second cut.

In order to achieve the above objects of the present invention, there is provided an electric discharge machining control circuit having a pulse oscillation control circuit for generating a pulse, stream an electric discharge machining circuit which charges a capacitor through a switching element which is turned on/off in response to the pulses from said pulse oscillation control circuit, and discharges a charge current between a wire electrode and a workpiece; and a short-circuit detector for detecting machining voltage between said wire electrode and for the workpiece and comparing the machining voltage with a reference voltage to detect a short circuit between the wire electrode and the workpiece, so that a numerical control device causes said pulse oscillator control circuit to stop generating the pulse stream when said short-circuit detector produces a short-circuit detection signal, wherein the electric discharge machining control circuit further comprises a reference voltage switching circuit for decreasing the reference voltage applied to the short-circuit detector when a second cut instruction signal is generated, thereby decreasing the average machining voltage used to perform a second of the workpiece.

According to the present invention there is also provided an interval signal blocking circuit for generating a second cut instruction signal and to block an interval signal generated from an interval signal oscillator, thus stopping generation of the pulse stream at predetermined intervals when the wire electrode is temporarily in contact with the workpiece, or when a phenomenon similar to a short circuit between the wire electrode and the workpiece occurs, thereby stabilizing electric discharge machining of the second cut.

According to the present invention as described above, since the reference voltage applied to the short-circuit detector is lowered in response to the second cut instruction signal, the short-circuit detector will not generated a short-circuit detection signal which is caused by a decrease in the average machining voltage. Therefore, the average machining voltage is lowered during the second cut operation, and thus electric discharge machining can be performed at low energy. The shape of the workpiece can be easily corrected and the roughened cut surface can be smoothed. In addition, the cut wall surface will be linear. The internal signal can be blocked in response to the second cut instruction signal so that electric discharge machining in the second cut mode can be stabilized.

DETAILED DESCRIPTION OF THE PREFERRED EMBODIMENT

The present invention will be described in detail with reference to the accompanying drawings.

Figure 1:
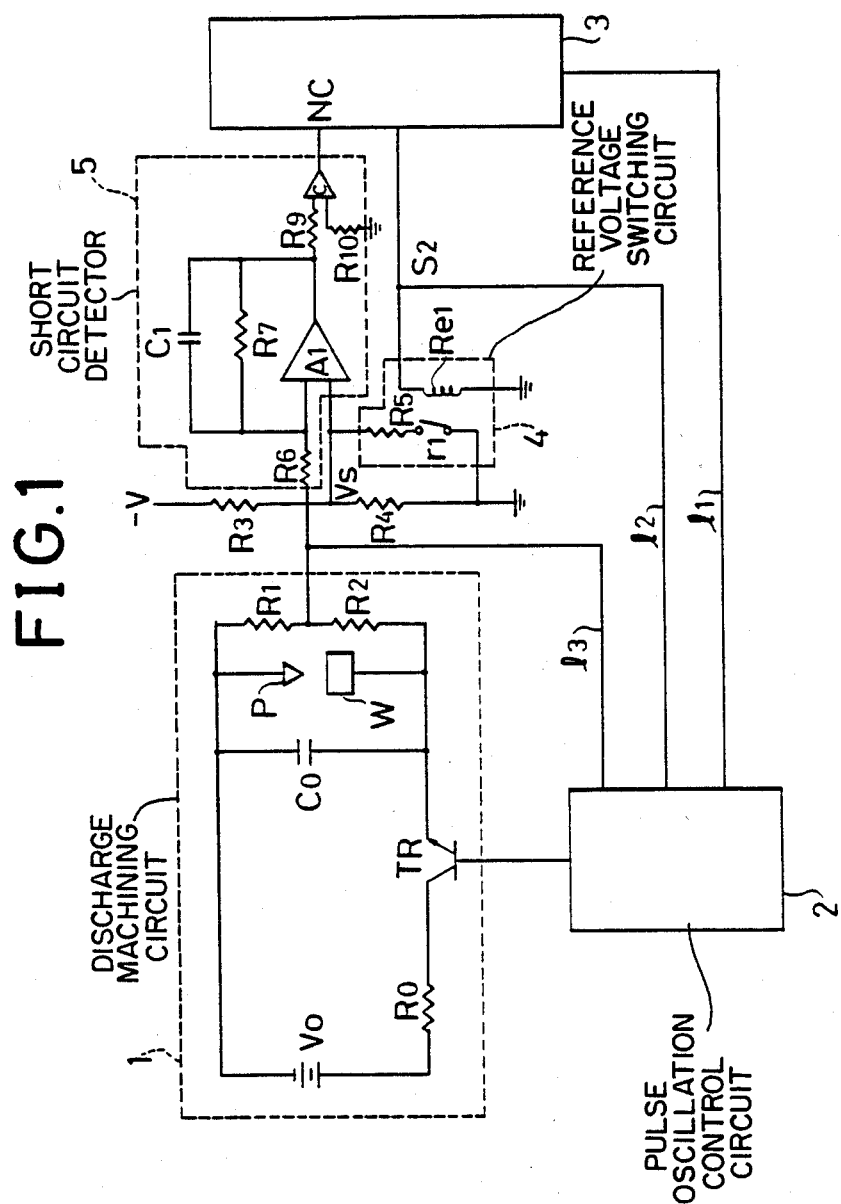
FIG. 1 is a circuit diagram of an electric discharge machining control circuit according to the present invention.

FIG. 1 is a circuit diagram of an electric discharge machining control circuit according to the present invention. The electric discharge machining control circuit comprises an electric discharge machining circuit 1, a pulse oscillation control circuit 2, a numerical control device 3, a reference voltage switching circuit 4 and a short-circuit detector 5. The pulse oscillation control circuit 2 is illustrated in detail in FIG. 2. As compared with the conventional electric discharge machining control circuit, the electric discharge machining control circuit of the present invention has the additional features of the reference voltage switching circuit 4 and an interval signal blocking circuit (to be described later) in the pulse oscillation control circuit 2 for controlling a second cut. Other components of the control circuit are the same as those of the conventional circuit.

In FIG. 1 the reference symbols identify circuit elements as follows: P denotes a wire electrode; W denote a workpiece; V0 denotes a DC power supply for generating a machining voltage; TR corresponds to a switching element such as a switching transistor; C0 indicates a capacitor which is subjected to charge/discharge; R1 and R2 correspond to respective resistors. The resistors R1 and R2 shunt the machining voltage to be applied between the wire electrode P and the workpiece W. A shunt voltage is supplied to a comparator 8 (FIG. 2) in the pulse oscillation control circuit 2 through a differential amplifier A1 in the short-circuit detector 5 and a signal line 13. The differential amplifier A1 also receives a reference voltage. The reference voltage is switched by the reference voltage switching circuit 4. In FIG. 1 reference symbol C denotes a comparator receiving an output generated from the differential amplifier A1. The comparator detects a short circuit between the wire electrode P and the workpiece W. Reference symbol Re1 denotes a relay. Energization/deenergization of the relay Re1 causes a change in the reference voltage applied to the short-circuit detector 5.

Figure 2:
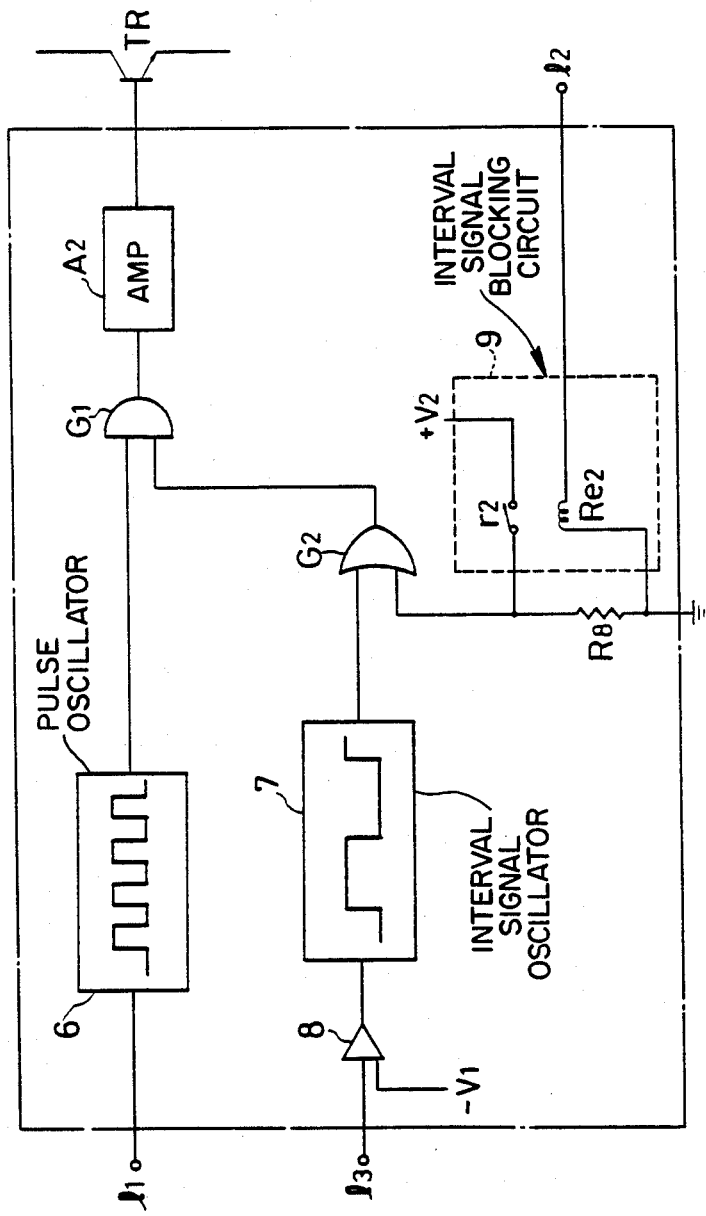
FIG. 2 is a circuit diagram of a pulse oscillation control circuit.

In the pulse oscillation control circuit 2 shown in FIG. 2, reference numeral 6 denotes a pulse oscillator; and reference numeral 7 denotes an interval signal oscillator. The interval signal generates 7 oscillates an interval signal in response to the signal supplied from the comparator 8. Reference symbol G1 denotes an AND gate; reference symbol G2 denotes an OR gate reference symbol A2, an amplifier reference symbol and Re2 denotes a relay. When the relay Re2 is disabled, a contact r2 of the relay Re2 is opened, so that the output signal from the interval signal oscillator 7 is gated through the OR gate G2. The pulse stream from the pulse oscillator 6 is outputted from the pulse oscillation control circuit 2 via the AND gate G1 and the amplifier A2 when the output from the interval signal oscillator 7 is set at H level. As a result, the switching element TR is turned on and off. However, when the relay Re2 is enabled a of H level is normally supplied to the OR gate G2 through the AND gate G1, thus the pulse stream from the pulse oscillator 6 is normally outputted During the normal first cut a signal is not supplied from the numerical control device 3 on a signal line 12, thus the relays Re1 and Re2 are not be enabled and electric discharge machining is performed in a conventional manner. In particular, the pulse stream is generated by the pulse oscillator 6. At the same time, during normal machining the interval signal oscillator 7 is normally triggered in response to the signal supplied from the comparator 8 to generate the H level signal. As a result, the pulse stream from the pulse oscillator 6 is outputted from the pulse oscillation control circuit 2 via the AND gate G1 and the amplifier A2. For this reason, the switching element TR in the electric discharge machining circuit 1 repeats the ON/OFF operation.

When the switching element TR is turned on, the capacitor C0 is charged through a resistor R0 and the charge voltage is applied between the wire electrode P and the workpiece W. In normal operation a discharge current flows from the capacitor C0 to a gap between the wire electrode P and the workpiece W in the form of a discharge, thereby performing electric discharge machining.

The resistors R1 and R2 connected across the wire electrode P and the workpiece W shunt the machining voltage. A shunt voltage signal is supplied to the comparator 8 in the pulse oscillation control circuit 2 via the signal line 13. The shunt voltage signal is compared with a reference voltage $-V1$ by the comparator 8. In addition, the shunt voltage signal is supplied to the short-circuit detector 5 which comprises resistors R6 and R7, a capacitor C1, the differential amplifier A1 and the comparator C. In the short-circuit detector the shunt voltage is compared with a reference voltage Vs so as to detect whether or not there is a short circuit between the wire electrode P and the workpiece W.

When there is a short circuit between the wire electrode P and the workpiece W, the voltage across the wire electrode P and the workpiece W drops. Therefore, the resultant shunt voltage also drops. The difference between the reference voltage Vs and this shunt voltage is amplified by the differential amplifier A1 and comprises a short-circuit signal when output from the comparator C. When the short-circuit signal is generated the numerical control circuit 3 supplies a signal on a signal line 11 so that the pulse ocillator 6 shown in FIG. 2 stops generating the pulse stream, thereby interrupting an electric discharge.

On the other hand, when the electrode P is temporarily in contact with the workpiece W, or a phenomenon similar to a short cicuit occurs due to insertion of a chip between the electrode P and the workpiece W, a shunt voltage signal obtained by means of the resistors R1 and R2 is supplied to the comparator 8 in the pulse oscillation control circuit 2 via the signal line 13 and is compared with a reference voltage $-V1$. In response to the output signal from the comparator 8 the interval signal oscillator 7 generates an interval signal having a longer pulse duration than that of the pulse stream from the pulse oscillator 6. While the longer interval signal is an H level the AND gate is enabled through the OR gate G2 so that the oscillated pulse from the pulse oscillator 6 is supplied to the switching element TR through the amplifier A2. As a result, the switching element TR repeats the ON/OFF operation with a duty cycle corresponding to that of the pulse stream supplied from the pulse oscillator 6, while the interval signal is set at H level, thereby controlling temporary short circuit between the electrode P and the workpiece W.

During normal operation free from the temporary short circuits, interval signal oscillator 7 is normally triggered in response to the signal from the comparator 8 and continues to generate the H level signal, thereby applying the pulse stream from the pulse oscillator 6 to the transistor TR.

The foregoing describes conventional electric discharge machining during the first cut mode.

The operation of the second cut mode according to the present invention will now be described.

When a second cut instruction is generated by the numerical control device 3 or by a manual switch, the duty cycle of the pulse stream generated by the pulse oscillator 6 changes, the resistance of the resistor R0 is increased to decrease a current, and a capacitance of the capacitor C0 is decreased to decrease the average machining voltage. Means for changing the duty cycle, the resistance and the capacitance are known to those skilled in the art, and a detailed description thereof will thus be omitted.

When the average machining voltage decreases the voltage shunted by the resistors R1 and R2 connected across the wire electrode P and the workpiece W also decreases. However, the reference voltage Vs does not decrease and thus the short-circuit detector 5 normally produces the short-circuit detection signal representing a short circuit between the electrode P and the workpiece W, so that the pulse oscillator 6 stops outputting a pulse stream in response to the signal generated from the numerical control device 3.

To avoid this problem the present invention employs a reference voltage switching circuit 4 to decrease the reference voltage Vs. In the second cut mode, a signal is supplied from the numerical control device 3 on signal line 12. This signal enables the relay Re1 in the reference voltage switching circuit 4, and connects the resistor R5 in parallel with the resistor R4 to decrease the reference voltage.

The signal on signal line 12 is also supplied to an interval signal blocking circuit 9 so as to operate the relay Re2 therein. The contact r2 of the relay Re2 is thus connected to supply the normally high level signal to the AND gate G1 through the OR gate G2. Without this blocking unstable electric discharge results when the interval signal oscillator 7 generates the interval signal during the second cut mode. However, when the H level signal is normally supplied to the AND gate G1, the interval signal is disabled.

In the above embodiment, the interval signal oscillator 7 comprises a circuit for generating a longer interval signal in response to detection of a short circuit. The interval signal oscillator 7 may count pulses generated by the pulse oscillator 6 and generates the ON/OFF signal for every predetermined count. In the above embodiment, the interval signal blocking circuit 9 is connected to the output side of the interval signal oscillator 7. However, the interval signal blocking circuit 9 may be inserted at the input side of the comparator 8 so as to normally generate the H level signal from the interval signal oscillator 7.

We claim:

1. An electric discharge machining control circuit comprising:
    a pulse oscillation control circuit means for generating a pulse stream;
    an electric discharge machining circuit having a variable circuit constant, operatively connected to said pulse oscillation control circuit means, including a capacitor, a switching means operatively connected to said capacitor which switching means is turned on and off in response to said pulse stream for said pulse oscillation control circuit means for applying a discharge current between a wire electrode and a workpiece in accordance with the variable cicuit constant;
    a short-circuit detector means, operatively connected to said electric discharge machining circuit, for comparing a machining voltage between the wire electrode and the workpiece with a reference voltage and for detecting a short circuit between the wire electrode and the workpiece;
    gate means, operatively connected to said pulse oscillation control circuit means, for inhibiting generation of said pulse stream in response to said short-circuit detector detecting a short-circuit;
    receiving means for receiving a second cut instruction;
    average machining voltage switching means, operatively connected to said receiving means, for decreasing an average machining voltage applied between the wire electrode and the workpiece in response to said second cut instruction, by changing a value of said variable circuit constant from that employed during rough machining;
    reference voltage switching means, operatively connected to said receiving means, for generating the reference voltage applied to said short-circuit detector means, and for decreasing the reference voltage applied to the short-circuit detector means in response to said second cut instruction from a value applied during rough machining to a lower value such that errors in said detecting of a short circuit are prevented.

2. A circuit according to claim 1, wherein said gate means comprises:
    an interval signal oscillator means for generating an interval signal for inhibiting generation of said pulse stream at predetermined intervals in response to said short-circuit detector means detecting one of temporary contact between said wire electrode and the workpiece and a phenomenon similar to a short circuit between said wire electrode and the workpiece occurs; and
    an interval signal blocking circuit means for blocking the interval signal oscillator means from inhibiting generation of said pulse stream, in response to the second cut instruction signal.

3. A circuit according to claim 2, wherein said interval signal oscillator means comprises an oscillator.

4. A circuit according to claim 2, wherein said interval signal oscillator means includes counter means for counting output pulses generated by said pulse oscillator and produces said interval signal for every predetermined count.

5. A circuit according to claim 2, wherein said interval signal blocking circuit means blocks an output from said interval signal oscillator means.

6. A circuit according to claim 3, wherein said interval signal blocking circuit means blocks oscillation of said interval signal oscillator means.

7. A circuit according to claim 1, wherein said electric discharge machining circuit includes a resistor operatively connected in parallel with said wire electrode and the workpiece and in series with said switching element, and wherein the value of the variable circuit constant comprises at least one of the capacitance of said capacitor and the resistance of said resistor.

8. A circuit according to claim 4, wherein said interval signal blocking circuit means blocks oscillation of said interval signal oscillator means.

9. An electric discharge machining control circuit for controlling a discharge voltage applied between a wire electrode and a workpiece in a wire-electric discharge machine, said circuit comprising:
    discharge machining means, having a variable circuit element with a value, for applying a discharge voltage across a wire electrode and a workpiece in response to a control signal and in accordance with the value of the variable circuit element, and for generating a shunt voltage varying in accordance with the discharge voltage;
    short-circuit detector means, operatively connected to receive a reference voltage and a shunt voltage, for detecting a short circuit between the wire electrode and the workpiece and a phenomenon similar to a short circuit, in accordance with said shunt voltage and said reference voltage;
    receiving means for receiving a second cut signal;
    average machining voltage switching means, operatively connected to the receiving means and to the discharge machining means, for decreasing an average machining voltage applied between the wire electrode and the workpiece in response to the second cut instruction, by changing the value of the variable circuit element from the employed during rough machining;

switching means, operatively connected to the receiving means and to the short-circuit detector means, for generating said reference voltage and for lowering said reference voltage in respnse to said second cut signal to a level such that errors in said detecting circuit are prevented;

pulse stream generator means, operatively connected to the discharge machining means and to the short-circuit detector means, for generating said control signal in accordance with said short circuit detection, said second cut signal and said shunt voltage;

interval signal oscillator means, operatively connected to the discharge machining means, for generating an inhibit signal to inhibit the generation of said control signal in response to said shunt voltage dropping below a predetermined value; and blocking means, operatively connected to the switching means and to the interval signal oscillator means, for preventing said inhibit signal from inhibiting the generation of said control signal, in response to said second cut instruction.

* * * * *

UNITED STATES PATENT AND TRADEMARK OFFICE
CERTIFICATE OF CORRECTION

PATENT NO. : 4,614,854
DATED : September 30, 1986
INVENTOR(S) : Obara et al.

It is certified that error appears in the above-identified patent and that said Letters Patent is hereby corrected as shown below:

Column 1, line 56, "dscharge" should be --discharge--;
         line 60, "pulse, stream" should be --pulse stream;--.
Column 2, line 19, after "circuit" insert --occurs--;
         line 27, "generated" should be --generate--;
         line 67, "denote" should be --denotes--.
Column 3, line 10, "13" should be --$\ell$3--;
         line 23, delete "7 oscillates";
         line 27, "A2," should be --A2 denotes--; "amplifier" should be --amplifier;--;
         line 37, delete "of";
         line 39, "outputted" should be --outputted.--;
         line 41, "12," should be --$\ell$2,--;
         line 66, "13." should be --$\ell$3.--.
Column 4, line 16, delete "a"; and "11" should be --$\ell$1--;
         line 21, "cicuit" should be --circuit--;
         line 25, "13" should be --$\ell$3--;
         line 31, "an" should be --at--;
         line 41, delete "the";
         line 42, after "circuits," insert --the--;

UNITED STATES PATENT AND TRADEMARK OFFICE
CERTIFICATE OF CORRECTION

PATENT NO. : 4,614,854

DATED : September 30, 1986

INVENTOR(S) : Obara et al.

Page 2 of 2

It is certified that error appears in the above-identified patent and that said Letters Patent is hereby corrected as shown below:

Column 5, line 7, "12." should be --$\ell$2--;
line 11, "12" should be --$\ell$2--;
line 47, "cicuit" should be --circuit--.

Signed and Sealed this

Twentieth Day of January, 1987

Attest:

DONALD J. QUIGG

*Attesting Officer*  *Commissioner of Patents and Trademarks*